US008689004B2

(12) United States Patent
Dalzell et al.

(10) Patent No.: US 8,689,004 B2
(45) Date of Patent: Apr. 1, 2014

(54) PLUGGABLE CLAIM PROVIDERS

(75) Inventors: Javier Dalzell, Issaquah, WA (US); Bryant Fong, Seattle, WA (US); Sarat Chandra Subramaniam, Bellevue, WA (US); Christian Roy, Redmond, WA (US); Sadia Sharmin, Seattle, WA (US); Benoit Schmitlin, Paris (FR); Venkatesh Veeraraghavan, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 251 days.

(21) Appl. No.: 12/969,007

(22) Filed: Dec. 15, 2010

(65) Prior Publication Data

US 2012/0117609 A1    May 10, 2012

Related U.S. Application Data

(60) Provisional application No. 61/410,700, filed on Nov. 5, 2010.

(51) Int. Cl.
*H04L 29/06* (2006.01)

(52) U.S. Cl.
USPC .......... 713/185; 713/182; 726/2; 726/3; 726/4; 726/5; 726/6; 726/7; 726/8; 726/9; 726/10

(58) Field of Classification Search
USPC .......... 713/185, 182; 726/2, 3, 4, 5, 6, 7, 8, 9, 726/10
See application file for complete search history.

(56) References Cited

U.S. PATENT DOCUMENTS

| | | | |
|---|---|---|---|
| 6,701,314 B1 | 3/2004 | Conover | |
| 7,093,298 B2 | 8/2006 | Rodriquez | |
| 7,124,192 B2 | 10/2006 | High, Jr. | |
| 7,243,369 B2 | 7/2007 | Bhat | |
| 7,603,555 B2 * | 10/2009 | Schmidt et al. | 713/168 |
| 7,610,390 B2 * | 10/2009 | Yared et al. | 709/229 |
| 7,774,830 B2 * | 8/2010 | Dillaway et al. | 726/9 |
| 7,849,204 B2 * | 12/2010 | Yared et al. | 709/229 |
| 7,924,709 B2 * | 4/2011 | Lynn | 370/230 |
| 8,037,194 B2 * | 10/2011 | Yared et al. | 709/229 |
| 8,220,035 B1 * | 7/2012 | Pravetz et al. | 726/5 |
| 2002/0095571 A1 * | 7/2002 | Bradee | 713/164 |
| 2003/0149781 A1 * | 8/2003 | Yared et al. | 709/229 |
| 2004/0153558 A1 * | 8/2004 | Gunduc et al. | 709/229 |
| 2005/0091264 A1 | 4/2005 | Cameron | |
| 2005/0097351 A1 | 5/2005 | Patrick | |
| 2005/0254514 A1 * | 11/2005 | Lynn | 370/450 |
| 2006/0015727 A1 | 1/2006 | Birk | |
| 2006/0053296 A1 | 3/2006 | Busboom | |

(Continued)

OTHER PUBLICATIONS

"Configure Web SSO authentication by using ADFS (Windows SharePoint Services)" copyright 2007, 8 pages.

(Continued)

*Primary Examiner* — Bradley Holder
(74) *Attorney, Agent, or Firm* — Merchant & Gould (57) ABSTRACT

A server system receives and installs multiple claim provider plug-ins. Each of the claim provider plug-ins implements the same software interface. However, each of the claim provider plug-ins can provide claims that assert different things. Claims provided by the claim provider plug-ins can be used to control access of users to a resource.

13 Claims, 6 Drawing Sheets

(56) References Cited

U.S. PATENT DOCUMENTS

| | | | | |
|---|---|---|---|---|
| 2006/0095335 | A1* | 5/2006 | Kugel et al. | 705/26 |
| 2006/0123234 | A1* | 6/2006 | Schmidt et al. | 713/168 |
| 2006/0123472 | A1* | 6/2006 | Schmidt et al. | 726/8 |
| 2006/0195420 | A1 | 8/2006 | Kilroy | |
| 2006/0206931 | A1* | 9/2006 | Dillaway et al. | 726/9 |
| 2006/0236382 | A1 | 10/2006 | Hinton | |
| 2006/0248598 | A1 | 11/2006 | Johnson | |
| 2006/0259776 | A1 | 11/2006 | Johnson | |
| 2007/0156691 | A1 | 7/2007 | Sturms | |
| 2008/0014931 | A1* | 1/2008 | Yared et al. | 455/432.3 |
| 2008/0016232 | A1* | 1/2008 | Yared et al. | 709/229 |
| 2009/0165105 | A1 | 6/2009 | Chaudhry | 726/7 |
| 2009/0193493 | A1* | 7/2009 | Becker et al. | 726/1 |
| 2009/0320103 | A1 | 12/2009 | Veeraraghavan et al. | 726/4 |

OTHER PUBLICATIONS

"Installing MOSS as a Claims Aware Application in ADFS" ADFS Product Support Blog, accessed at: http://blogs.technet.com/adfs/archive/2007/02/14/installing-moss-as-a-claims-aware-appliation-in-adfs-aspx; accessed on: Sep. 20, 2007, 7 pages.

"Microsoft®, Windows SharePoint Services Role" copyright 2007, 7 pages.

Janczuk, T., "Windows Communication Foundation Authorization with Claims" copyright 2006, 2 pages.

Office Action (Non-Final) for U.S. Appl. No. 12/144,880 mailed Apr. 15, 2011, 15 pages.

Office Action mailed Sep. 28, 2011, in U.S. Appl. No. 12/144,880.

"[MS-CPSWS]: SharePoint Claim Provider Web Service Protocol Specification" © 2010, 80 pages.

"[MS-PEOPS]: People Web Service Protocol Specification" © 2010, 31 pages.

"RFC2258—Internet Nomenclator Project" © 1998, 12 pages.

"The Mack Page" © 2007-2009, 12 pages.

Buchta et al.; "Oracle Secure Enterprise Search 11g" Version 11.1.2, © 2005, 37 pages.

Microsoft®, Windows SharePoint Services Role updated Sep. 21, 2007, [Internet], 7 pp: http://technet2.microsoft.com/windowsserver2008/en/library/8e791b89-86c8-4c72-bb07-71656a25ef161033.mspx?mfr=true, printed Sep. 20, 2007.

Janczuk, T., Windows Communication Foundation Authorization with Claims, [Internet] Microsoft, 2 pp. http://wcf.netfx3.com/files/folders/3626/download.aspx, printed Sep. 20, 2007.

Installing MOSS as a claims aware application in ADFS, [Internet], ADFS Product Support Blog, 7 pp. http://blogs.technet.com/adfs/archive/2007/02/14/installing-moss-as-a-claims-aware-appliation-in-adfs.aspx, printed Sep. 20, 2007.

Configure Web SSO authentication by using ADFS (Windows SharePoint Services), [Internet], updated Feb. 2007, 8 pp. http://technet2,microsoft.com/windowsserver/WSS/en/library/306b2d56-4419-432b-bf72-b4cae3845b00103.mspx?mfr=true, printed Sep. 20, 2007.

* cited by examiner

PLUGGABLE CLAIM PROVIDERS

This application claims the benefit of U.S. Provisional Patent Application No. 61/410,700, filed Nov. 5, 2010, the entirety of which is hereby incorporated by reference.

BACKGROUND

Some web services use security tokens to ensure that users are authorized to access resources provided by the web services. To obtain a security token, a user provides a credential to a security token service (STS). The STS attempts to authenticate an identity of the user based on the credential. If the STS successfully authenticates the identity of the user, the STS gathers claims from one or more claim providers. The claims can comprise various types of data. For example, the claims can comprise assertions about the identity of the user.

After gathering the claims from the claim providers, the STS generates a security token and provides the security token to the user. The security token comprises at least some of the claims provided by the claim providers. The STS digitally signs the security token to make it possible to determine whether the security token has been altered. The STS can also encrypt the security token for additional security.

After receiving the security token, the user provides the security token to the web service. When the web service receives the security token, the web service uses the claims in the security token to determine whether or not the user is authorized to access a resource provided by the web service.

SUMMARY

A server system receives and installs multiple claim provider plug-ins. Each of the claim provider plug-ins implements the same software interface. However, each of the claim provider plug-ins can provide claims that assert different things. Claims provided by the claim provider plug-ins can be used to control access of users to a resource. In at least some embodiments, it is not necessary to make changes to existing software components for the existing software components to use the claim provider plug-ins. This property of the clam provider plug-ins can be advantageous because it may enable system administrators to more easily add claim providers to their server systems.

This summary is provided to introduce a selection of concepts. These concepts are further described below in the Detailed Description. This summary is not intended to identify key features or essential features of the claimed subject matter, nor is this summary intended as an aid in determining the scope of the claimed subject matter.

DETAILED DESCRIPTION

Figure 1:
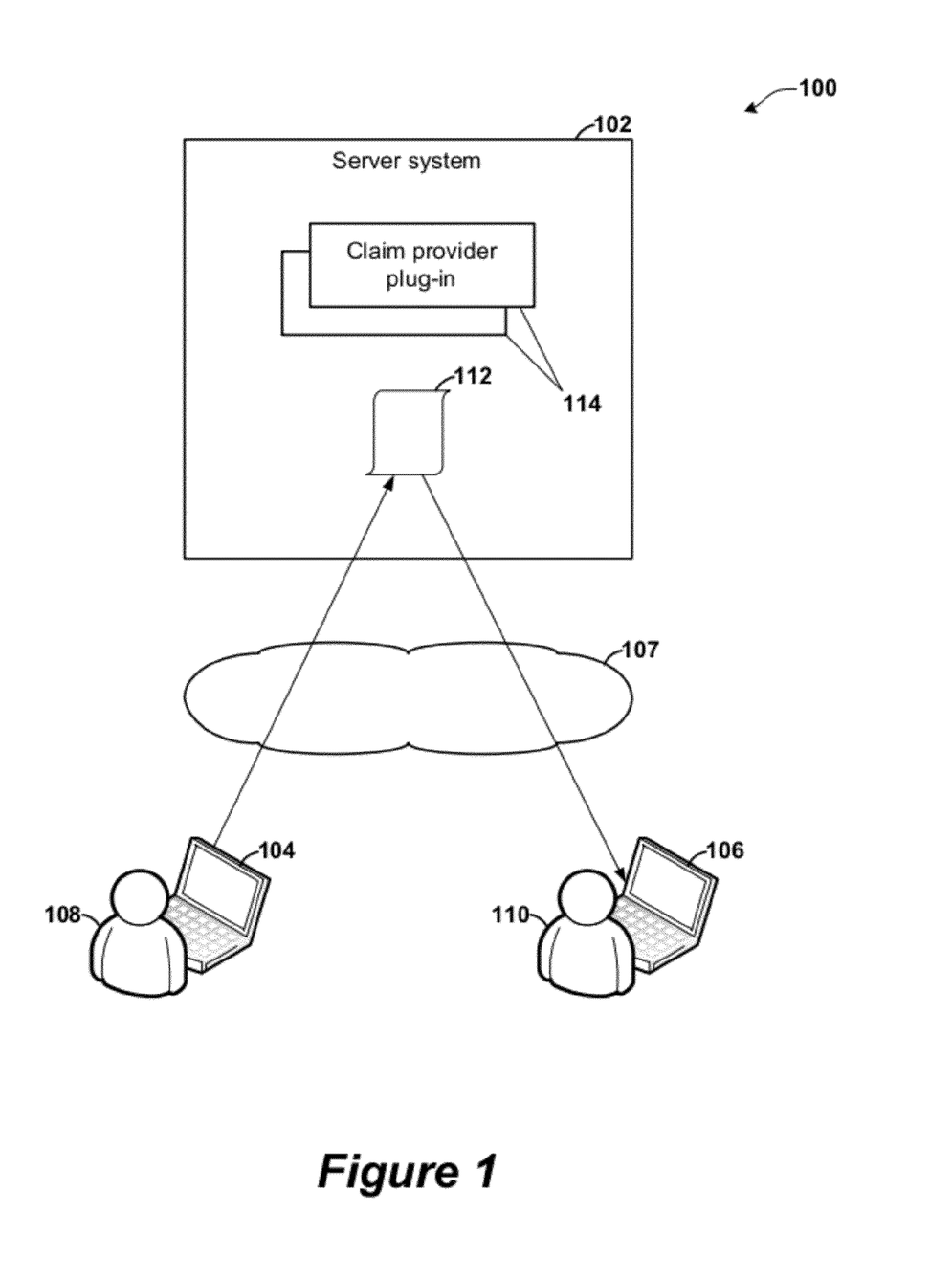
FIG. 1 is a block diagram illustrating an example system.

FIG. 1 is a block diagram illustrating an example system 100. As illustrated in example of FIG. 1, the system 100 comprises a server system 102. The server system 102 comprises one or more computing devices. In some embodiments, the server system 102 comprises one or more computing devices of a type described below with regard to the example of FIG. 6. In various embodiments, various types of entities provide the server system 102. For example, a business organization, a governmental organization, a non-profit organization, or another type of entity can provide the server system 102.

The system 100 also comprises a client device 104 and a client device 106. In some embodiments, the client device 104 and the client device 106 comprise one or more computing devices of the type described below with regard to the example of FIG. 6. The client device 104 and the client device 106 run web browser applications, workplace productivity applications, or other types of software applications that receive input and display output. A user 108 uses the client device 104. A user 110 uses the client device 106.

A network 107 enables the client device 104 and the client device 106 to communicate with the server system 102. In various embodiments, the network 107 can comprise various types of communications networks. For example, the network 107 can comprise a wide area network, such as the Internet. In another example, the network 107 can comprise another type of network, such as a local-area network, a public-switched telephone network, or a cellular telephone network. The network 107 can comprise wired and/or wireless communications links.

As illustrated in the example of FIG. 1, the server system 102 provides access via the network 107 to a resource 112. In various embodiments, the resource 112 can be a various types of resources. For example, the resource 112 can be a word processor document, a spreadsheet document, a slide presentation document, a desktop publishing document, a note-taking document, a web page document, a computer programming source code file, an executable file, an archive file, an email mailbox, or another type of resource.

Furthermore, multiple claim provider plug-ins 114 are installed on the server system 102. Each of the claim provider plug-ins 114 is a pluggable software component that provides claims. A claim comprises an assertion by an entity. For example, a claim can comprise an assertion of a name, a job title, a membership in a group, or an age. In another example, claim can comprise assertions of things that are not tied to users' identities. For instance, a claim can comprise an assertion regarding financial data (e.g., the current price of stock XYZ is $5.52).

The server system 102 controls access to the resource 112 on the basis of claims provided by the claim provider plug-ins 114. As described in detail below, the user 110 wants to access the resource 112. For example, the user 110 may want to review or edit the content of the resource 112. In another example, the user 110 may want to delete or move the resource 112. In yet another example, the user 110 may want to execute the resource 112.

Before the user 110 is able to access the resource 112, the server system 102 authenticates an identity of the user 110. If the server system 102 successfully authenticates the identity of the user 110, the server system 102 generates a security token. A security token is a data structure comprising one or more claims. For example, the security token can contain a claim indicating that the user 110 works in the accounting department of a firm. In another example, the security token can contain a claim indicating that the user 110 is a client of a firm. After generating the security token, the server system 102 sends the security token to the client device 106.

After the client device 106 receives the security token, the client device 106 sends the security token back to the server system 102 along with an access request. The access request comprises a request to access the resource 112. When the server system 102 receives the security token and the access request, the server system 102 determines whether the user 110 is authorized to access the resource 112 by determining whether the claims in the security token are sufficient to satisfy a security policy for the resource 112. For example, a security policy for the resource 112 can specify that only members of a certain group are allowed to access the resource 112. In this example, the server system 102 can determine that the user 110 is authorized to access the resource 112 when the security token includes a claim that indicates that the user 110 is a member of the certain group.

Figure 2:
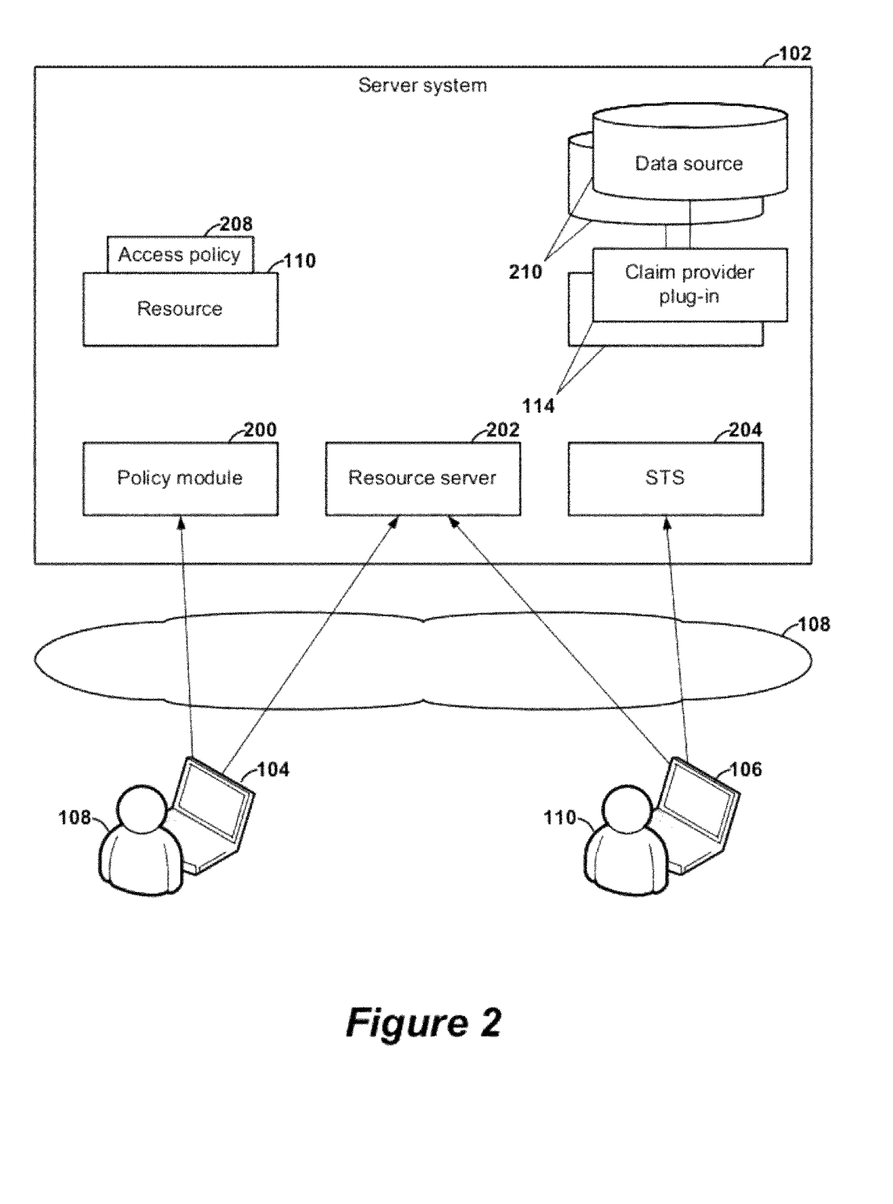
FIG. 2 is a block diagram illustrating example details of a server system.

FIG. 2 is a block diagram showing example details of the server system 102. As illustrated in the example of FIG. 2, the server system 102 comprises a policy module 200, a resource server 202, a security token service (STS) 204, and the claim provider plug-ins 114. The server system 102 also comprises the resource 112 and an access policy 208 for the resource 112. The access policy 208 comprises one or more data structures that express a policy governing access to the resource 112. For example, the access policy can be an access control list. The policy module 200 enables the user 108 to edit the access policy 208 for the resource 112. The resource server 202 provides a web service. The web service uses the access policy 208 to determine whether users are authorized to access the resource 112. The web service allows authorized users to access the resource 112. The STS 204 authenticates identities of users and issues security tokens to successfully authenticated users.

Furthermore, the server system 102 comprises multiple data sources 210. The data sources 210 store various types of data. For example, one of the data sources 210 can store an employee directory. In this example, another one of the data sources 210 can store financial data. In this example, yet another one of the data sources 210 can store criminal history data. The data sources 210 can be implemented in various ways. For example, one or more of the data sources 210 can be implemented as relational databases, such as SQL databases. In another example one or more of the data sources 210 can be implemented as directories, such as Lightweight Directory Access Protocol (LDAP) directories. Although the example of FIG. 2 shows the server system 102 as comprising the data sources 210, one or more of the data sources 210 are outside the server system 102 in some embodiments.

As mentioned briefly above, the claim provider plug-ins 114 are pluggable software components. Each of the claim provider plug-ins 114 implements a common software interface. For example, if there are two claim provider plug-ins 114, both of the claim provider plug-ins 114 implement the same software interface. The software interface declares a set of one or more methods that can be invoked by other software objects. Different ones of the claim provider plug-ins 114 implement the methods declared in the software interface in different ways. For example, each of the claim provider plug-ins 114 can implement a given method in different ways such that each of the claim provider plug-ins 114 uses different ones of the data sources 210.

Because the claim provider plug-ins 114 are pluggable, the claim provider plug-ins 114 can be installed in the server system 102 without changing the programming code in the server system 102 or reinstalling software in the server system 102. For example, it is not necessary to modify and/or recompile the programming language code of the policy module 200 or the STS 204 for the policy module 200 or the STS 204 to be able to utilize the claim provider plug-ins 114. In some embodiments, the policy module 200 and/or the STS 204 can start using the claim provider plug-ins 114 without needing to stop receiving and processing requests. Furthermore, because the claim provider plug-ins 114 are pluggable software components, the claim provider plug-ins 114 can be designed separately from other software installed on the server system 102.

Each of the claim provider plug-ins 114 is able to provide one or more claims. Furthermore, in some embodiments, each of the claim provider plug-ins 114 can provide claims asserting different things. For example, one of the claim provider plug-ins 114 can provide claims regarding buildings in which users work. In another example, one of the claim provider plug-ins 114 can provide claims regarding ages of users.

The server system 102 is physically implemented using one or more computing devices. These computing devices can belong to various types. For example, the server system 102 can be physically implemented using one or more standalone server devices, blade server devices, mainframe computers, personal computers, routers, switches, bridges, hubs, intrusion detection devices, firewall devices, and/or other types of computing devices.

Furthermore, in various embodiments, the policy module 200, the resource server 202, the STS 204, and the claim provider plug-ins 114 can be implemented in various ways. For example, the server system 102 can comprise a data storage system. The data storage system is a system of devices comprising one or more computer storage media that store computer-executable instructions. In this example, the server system 102 also comprises one or more processing units. When executed by the one or more processing units, the computer-executable instructions cause the server system 102 to provide the policy module 200, the resource server 202, the STS 204, and the claim provider plug-ins 114. In another example, the server system 102 can comprise one or more application-specific integrated circuits (ASICs). In this example, the ASICs, alone or in combination with the execution of computer-executable instructions, cause the server system 102 to provide the policy module 200, the resource server 202, and the STS 204.

Figure 3:
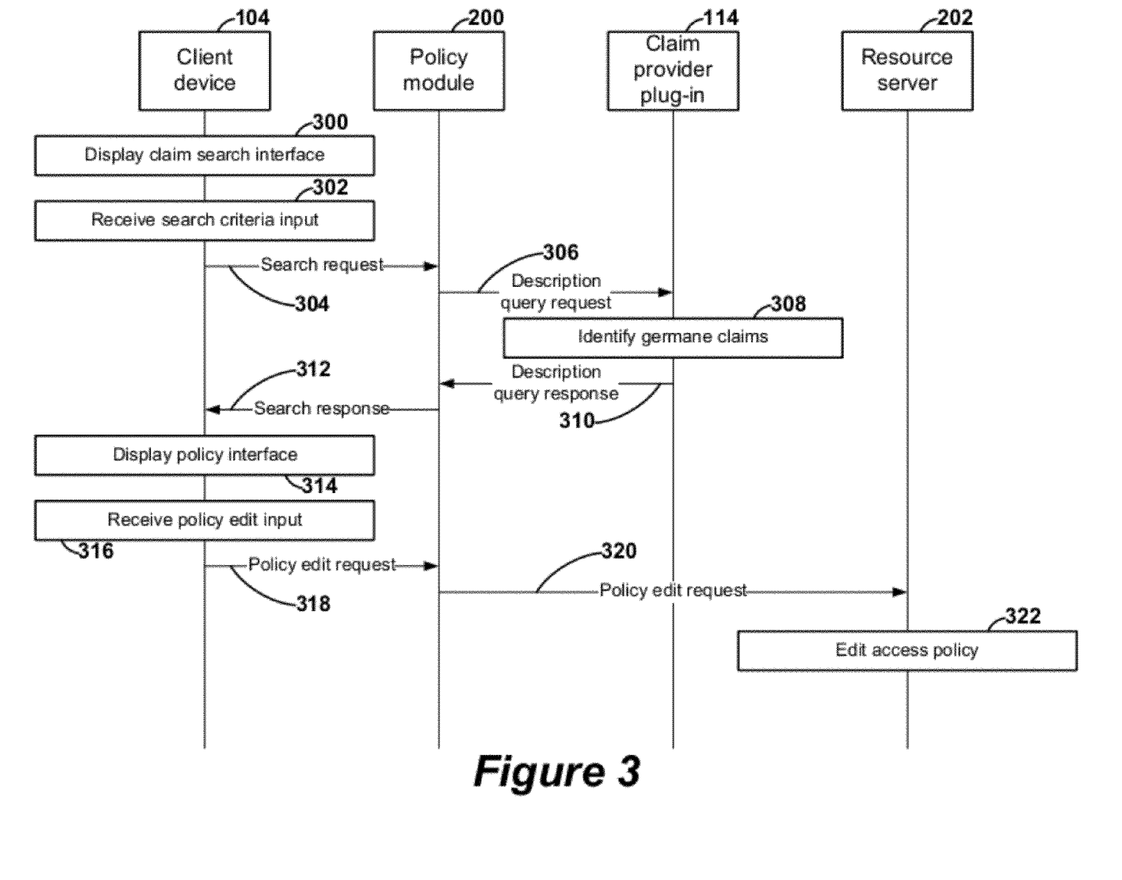
FIG. 3 is a communications diagram showing an example exchange of messages to edit an access policy for a resource.

FIG. 3 is a communications diagram showing an example exchange of messages to edit the access policy 208 for the resource 112. As illustrated in the example of FIG. 3, the client device 104 displays a claim search interface to the user 108 (300). The claim search interface comprises one or more features to receive search criteria from the user 108. For example, the claim search interface can comprise one or more text areas that allow the user 108 to enter the search criteria.

In various embodiments, the client device 104 can display the claim search interface to the user 108 in various ways. For example, the server system 102 can provide interface data to the client device 104. The interface data represents the claim search interface. In this example, a web browser application or other application running on the client device 104 uses the interface data to display the claim search interface. In another example, a thick-client application, such as an office productivity application, runs on the client device 104. Example office productivity applications include word processor applications (e.g., MICROSOFT® Word), spreadsheet applications (e.g., MICROSOFT® EXCEL®), slide presentation applications (e.g., MICROSOFT® POWERPOINT®), desktop publishing applications (e.g., MICROSOFT® Office Publisher), note-taking applications (e.g., MICROSOFT® ONENOTE®), database access applications (e.g., MICROSOFT® ACCESS®), and so on. In this example, the thick-client application displays the claim search interface in a window.

The client device 104 receives search criteria input from the user 108 via the claim search interface (302). The search criteria input specifies one or more search criteria. The search criteria describe claims that the user 108 wants to add to the access policy 208 for the resource 112. For example, if the user 108 only wants engineers to be able to access the resource 112, the search criteria 300 can include the word "engineer." In another example, the search criteria can include scope parameters. In this example, a scope parameter specifies a requirement that is not dependent on keywords used in descriptions of claims. For instance, a scope parameter can specify that the claims must be applicable to groups of users, and not individual users. Another scope parameter can specify that claims must be applicable to more or less than a given number of users.

The client device 104 can display the claim search interface and receive the search criteria input at various times. For example, the user 108 can create the resource 112 on the client device 104. In this example, the user 108 can then upload the resource 112 to the server system 102. In this example, the client device 104 can display the claim search interface and receive the search criteria input when the user 108 uploads the resource 112 to the server system 102. In another example, the user 108 creates the resource 112 on the server system 102 using the client device 104. In this example, the client device 104 can display the claim search interface and receive the search criteria input when the user 108 saves the resource 112 for a first time. In yet another example, the resource 112 is already stored on the server system 102. In this example, the client device 104 can display the claim search interface and receive the search criteria input when the user 108 navigates to a web page provided by the server system 102.

After the client device 104 receives the search criteria input, the client device 104 provides a search request 304 to the policy module 200. The search request 304 comprises search criteria data. The search criteria data represent the search criteria specified by the search criteria input. When the policy module 200 receives the search request 304, the policy module 200 sends a description query request 306 to the claim provider plug-in 114. The description query request 306 comprises a request to obtain descriptions of claims that satisfy the search criteria. For example, the description query request 306 can comprise a request to invoke a description query method declared in the software interface implemented by claim provider plug-ins 114. For the sake of simplicity, the example of FIG. 3 only shows a single claim provider plug-in 114. Nevertheless, the policy module 200 can send the description query requests to each of the claim provider plug-ins 114 installed in the server system 102.

When the claim provider plug-in 114 receives the description query request 306, the claim provider plug-in 114 identifies germane claims (308). The germane claims are claims provided by the claim provider plug-in 114 that satisfy the search criteria 300. For example, the search criteria can include the keywords "job title" and "engineer." In this example, the claim provider plug-in 114 can provide claims that assert that "engineer" is the job title of certain users. Consequently, in this example, the claim provider plug-in 114 identifies these claims as germane claims. The software interface of the claim provider plug-in 114 does not dictate how the claim provider plug-in 114 identifies the germane claims. Rather, a programmer of the claim provider plug-in 114 decides when programming the claim provider plug-in 114 how the claim provider plug-in 114 is to identify the germane claims. For example, the programmer of the claim provider plug-in 114 can decide which ones of the data sources 210 the claim provider plug-in 114 is to use when identifying the germane claims. In another example, the programmer of the claim provider plug-in 114 can decide how the claim provider plug-in 114 is to interpret the search criteria 300.

In various embodiments, the claim provider plug-in 114 identifies the germane claims in various ways. For example, the claim provider plug-in 114 can execute one or more queries against one or more of the data sources 210. In this example, the queries specify the search criteria 300. In another example, the claim provider plug-in 114 communicates with one or more other trusted services via a network to identify the germane claims.

After the claim provider plug-in 114 identifies its germane claims, the claim provider plug-in 114 provides a description query response 310 to the policy module 200. The description query response 310 comprises claim description data. The claim description data describes the germane claims provided by the claim provider plug-in 114. After the policy module 200 receives description query responses from each of the claim provider plug-ins 114, the policy module 200 provides a search response 312 to the client device 104. The search response 312 comprises the claim description data from each of the claim provider plug-ins 114.

The claim description data can include various types of information regarding the germane claims. For example, the claim description data can include a title for each of the germane claims. Furthermore, in this example, the claim description data can include tooltip data. The tooltip data includes brief textual descriptions of claims. In this example, the tooltip data for a claim can be displayed when the user 108 selects the title for the claim. In another example, the claim description data can include long-form written descriptions of the germane claims. In yet another example, the claim description data can specify applicable entity types for the germane claims. Example entity types include individual users, user groups, mail distribution lists, and other types of sets of one or more users. In this example, some claims might only be applicable to individual users, only to groups of users, or to both individual users and groups of users. In yet another example, the claim description data can include a hash table. The hash table stores information that may help the user 108 disambiguate claims. For example, the hash table can store email addresses associated with entities to which claims are applicable, names of owners of groups to which claims are applicable, names or addresses of buildings associated with individual claims, and so on.

Furthermore, in some embodiments, the claim description data comprises a hierarchy of nodes. In some such embodiments, the non-leaf nodes in the hierarchy can represent groups and leaf nodes in the hierarchy can represent claims associated with the groups. In such embodiments, the claim description data can also comprise data indicating that particular leaf nodes in the hierarchy are germane claims. The user 108 can navigate through the hierarchy to select desired claims.

When the client device 104 receives the search response 312 from the policy module 200, the client device 104 displays a policy interface to the user 112 (314). The policy interface is a user interface that enables the user 112 to edit the access policy 208 for the resource 112. To help the user 112 to edit the access policy 208 for the resource 112, the client device 104 uses the claim description data in the search response 312 to display information about the germane claims For example, the client device 104 can use the claim description data to display titles and long-form textual descriptions of the germane claims in the policy interface. In another example, the client device 104 can use the claim description data to display textual descriptions and applicable entity types for the germane claims. In yet another example, the client device 104 can use the claim description data to retrieve information about the germane claims from one or more web services.

In various embodiments, the claim description data in the search response 312 has various forms. For example, the claim description data can represent a web page containing information describing the available claims. In another example, the claim description data can comprise XML data usable by one or more scripts to add text or graphics describing the germane claims to a web page. In yet another example, the claim description data is in proprietary format used by a thick-client application running on the client device 104.

The client device 104 receives policy input from the user 108 via the policy interface (316). The policy input specifies edits that the user 108 wants to make to the access policy 208 for the resource 110. For example, the policy input can specify that the user 108 wants the access policy 208 to require users to provide a particular one of the germane claims in order to access the resource 110. In another example, the policy input can specify that the user 108 wants the access policy 208 to require users to provide a first or a second one of the germane claims in order to access the resource 110. Furthermore, in some embodiments, the user 108 is able to edit the access policy 208 to require users to provide different claims in order to access the resource 110 in different ways. For example, the user 108 can edit the access policy 208 such that users must provide a first claim in order to read information in the resource 112 and must additionally provide a second claim in order to write information to the resource 112.

In various embodiments, the client device 104 receives the policy input in various ways. For example, the client device 104 can display a form comprising checkboxes along with information describing the germane claims. In this example, the client device 104 can receive the policy input when the user 108 submits the form. In another example, the client device 104 can receive the policy input when the user 108 double clicks an onscreen element associated with one of the germane claims.

After receiving the policy input, the client device 104 sends a policy edit request 318 to the policy module 200. The policy edit request 318 instructs the policy module 200 to edit the access policy 208 in the manner indicated by the policy input. For example, the policy edit request 318 can instruct the policy module 200 to edit the access policy 208 to require users to provide a particular claim. In response to receiving the policy edit request 318, the policy module 200 sends a policy edit request 320 to the resource server 202. The policy edit request 320 instructs the resource server 202 to edit the access policy 208 in the manner indicated by the policy input. In response to receiving the policy edit request 320, the resource server 202 edits the access policy 208 in the manner indicated by the policy input (322).

In various embodiments, the client device 104, the policy module 200, the claim provider plug-in 114, and the resource server 202 can provide requests, responses, or other messages to one another in various ways. For example, direct method invocations can be used to provide such messages. For instance, the policy module 200 can provide the query requests 306 to the claim provider plug-ins 114 by invoking methods declared in the software interface implemented by the claim provider plug-ins 114. In another example, web services requests can be used to provide such messages. For instance, the client device 104, the policy module 200, the claim provider plug-in 114, and/or the resource server 202 can send SOAP or RPC protocol messages to one another. The SOAP or RPC protocol messages comprise requests to invoke methods declared in the software interface. In yet another example, HTTP requests and responses can be used to exchange such messages. For instance, the client device 104 can use a HTTP request to provide the search criteria 304 to the policy module 200.

Figure 4:
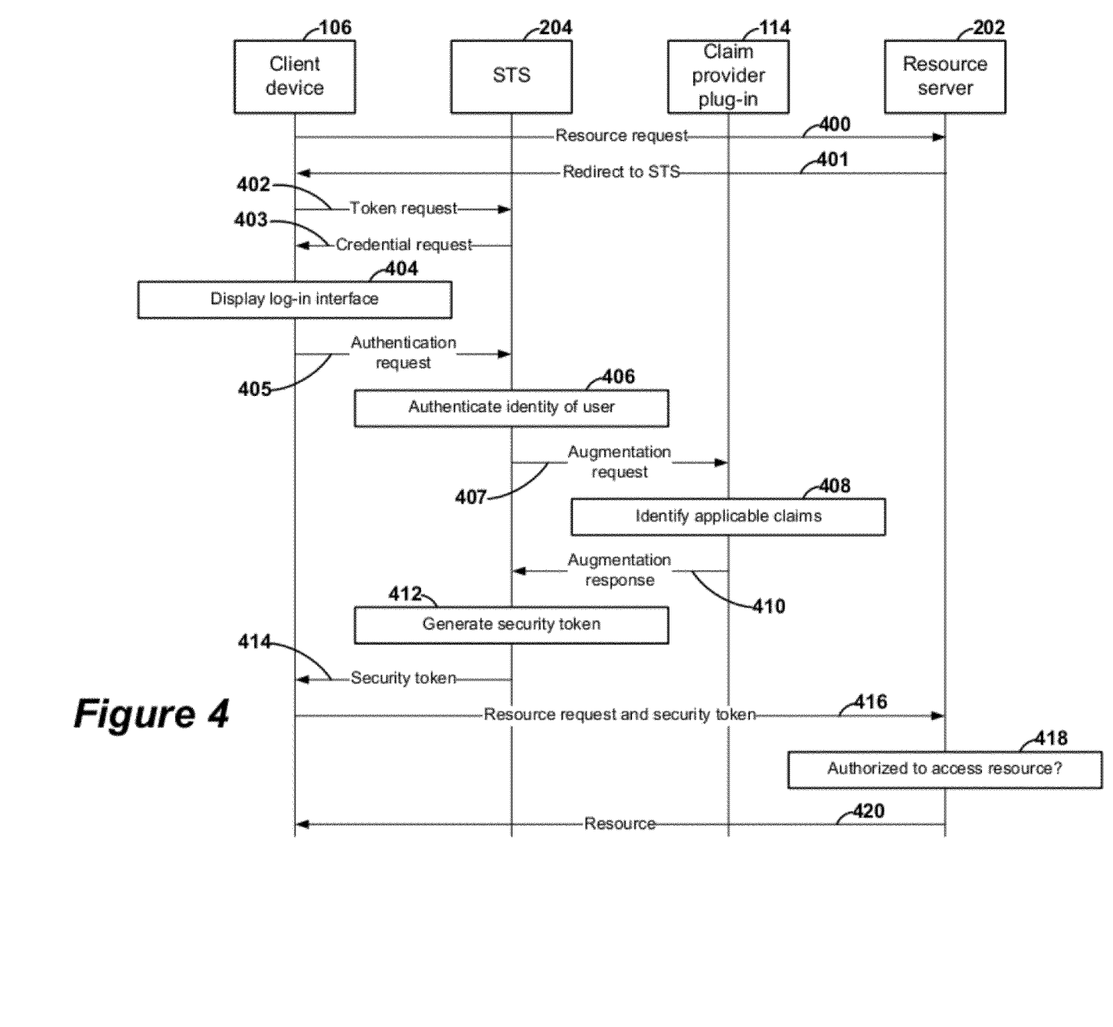
FIG. 4 is a communications diagram showing an example exchange of messages to access the resource.

FIG. 4 is a communications diagram showing an example exchange of messages to access the resource 112. As illustrated in the example of FIG. 4, the client device 106 sends a resource request 400 to the resource server 202. The resource request 400 is a request to access the resource 112. Because the resource request 400 is not accompanied by a security token, the resource server 202 sends a redirect message 401 to the client device 106. The redirect message 401 automatically causes the client device 106 to send a token request 402 to the STS 204. The token request 402 is a request for a security token. In response to the token request 402, the STS 204 sends a credential request 403 to the client device 106. The credential request 403 instructs the client device 106 to provide an authentication credential to prove the identity of the user 110. For example, the credential request 403 can instruct the client device 106 to provide a username and password.

When the client device 106 receives the credential request 403, the client device 106 displays an authentication interface to the user 110 (i.e., the user of the client device 106) (404). The authentication interface enables the user 110 to provide an authentication credential to the client device 106. The authentication credential can be in various forms. For example, the authentication credential can comprise a username/password pair. In another example, the authentication credential can comprise a digital certificate and a password. In yet another example, the authentication credential can comprise a one-time password, a smartcard, a PIN, or another type of evidence regarding the identity of the user 110.

After the client device 106 receives the authentication credential, the client device 106 provides an authentication request 405 to the STS 204. The authentication request 405 comprises data that represents the authentication credential. After receiving the authentication request 405, the STS 204 uses the authentication credential to authenticate an identity of the user 110 (406). For example, if the authentication credential comprises a username/password pair, the STS 204 determines whether the authentication credential contains the correct password for the username. In some embodiments, the STS 204 uses a computer network authentication protocol, such as Kerberos, to authenticate the identity of the user 110 using the authentication credential.

If the STS 204 successfully authenticates the identity of the user 110, the STS 204 provides an augmentation request 407 to the claim provider plug-in 114. The augmentation request 407 comprises a request to invoke an augmentation method of the claim provider plug-in 114. The augmentation method is declared in the software interface implemented by each of the claim provider plug-ins 114. In various embodiments, the STS 204 provides the augmentation request 407 to the claim provider plug-in 114 in various ways. For example, the STS 204 can directly invoke the augmentation method during execution of the STS 204. In another example, the STS 204 can invoke the augmentation method by sending one or more network messages to the claim provider plug-in 114. The network messages can conform to various networking protocols, such as SOAP and RPC.

When the augmentation method is invoked, the claim provider plug-in 114 identifies applicable claims (408). The applicable claims are claims that the claim provider plug-in 114 is able to provide with regard an identity of the user 110. For example, the claim provider plug-in 114 has access to a data source containing a list of accountants working for a company. In this example, if the list of accountants includes the user 110, the claim provider plug-in 114 can identify the claim "job title=accountant" as an applicable claim. In this example, if the list of accountants does not include the user 110, the claim provider plug-in 114 does not identify the claim "job title=accountant" as an applicable claim.

After the claim provider plug-in 114 identifies the applicable claims, the claim provider plug-in 114 provides an augmentation response 410 to the STS 204. The augmentation response 410 comprises data representing the applicable claims. The software interface specifies the form of the augmentation response 410. In various embodiments, the software interface can specify various forms for the augmentation response 410. For example, the augmentation response 410 can comprise pointers to or copies of software objects that represent separate ones of the applicable claims. In another example, the augmentation response 410 can comprise XML data that represent the applicable claims.

For the sake of simplicity, the example of FIG. 4 only includes one of the claim provider plug-ins 114. Nevertheless, the STS 204 can provide augmentation requests and receive augmentation responses from some or all of the claim provider plug-ins 114 installed in the server system 102.

When the STS 204 receives augmentation responses from the claim provider plug-ins 114, the STS 204 generates a security token 414 (412). The security token 414 includes data representing at least some of the applicable claims provided by the claim provider plug-ins 114. For example, the security token 414 can comprise a Security Assertion Markup Language (SAML) token that includes data representing the applicable claims provided by the claim provider plug-ins 114. Furthermore, the STS 204 digitally signs the security token 414 to make it possible to determine whether the security token 414 has been altered. The STS 204 can also encrypt the security token 414 for additional security. After the STS 204 generates the security token 414, the STS 204 sends the security token 414 to the client device 106.

After the client device 106 receives the security token 414, the client device 106 sends a resource request 416 along with the security token 414 to the resource server 202. The resource request 416 comprises a request by the client device 106 to access the resource 112. When the resource server 202 receives the resource request 416, the resource server 202 determines whether the user 110 is authorized to access the resource 112 (418).

The resource server 202 determines whether the user 110 is authorized to access the resource 112 by determining whether the claims in the security token 414 are sufficient to satisfy the access policy 208 for the resource 112. For example, the resource server 202 can determine that the user 110 is authorized to access the resource 112 when the security token 414 includes each of the claims required by the access policy 208. In another example, the access policy 208 can indicate that users must provide at least one claim in a list of claims. In this example, the resource server 202 can determine that the claims in the security token 414 are sufficient to satisfy the access policy 208 when the security token 414 contains any of the claims in the list. For instance, the access policy 208 can provide that users must provide claims indicating that they are either accountants or executives. In this instance, the security token 414 may contain a claim that indicates that the user 110 is an accountant, but not a claim that indicates that the user 110 is an executive. In this instance, the resource server 202 determines that the user 110 is authorized to access the resource 112.

In the example of FIG. 4, if the user 110 is authorized to access the resource 112, the resource server 202 sends data representing the resource 112 to the client device 106, or otherwise allows the client device 106 to access the resource 112. In other embodiments, the resource server 202 does not necessarily send data representing the resource 112 to the client device 106 when the user 110 is authorized to access the resource 112. If the user 110 is not authorized to access the resource 112, the resource server 202 does not allow the client device 106 to access the resource 112.

Figure 5:
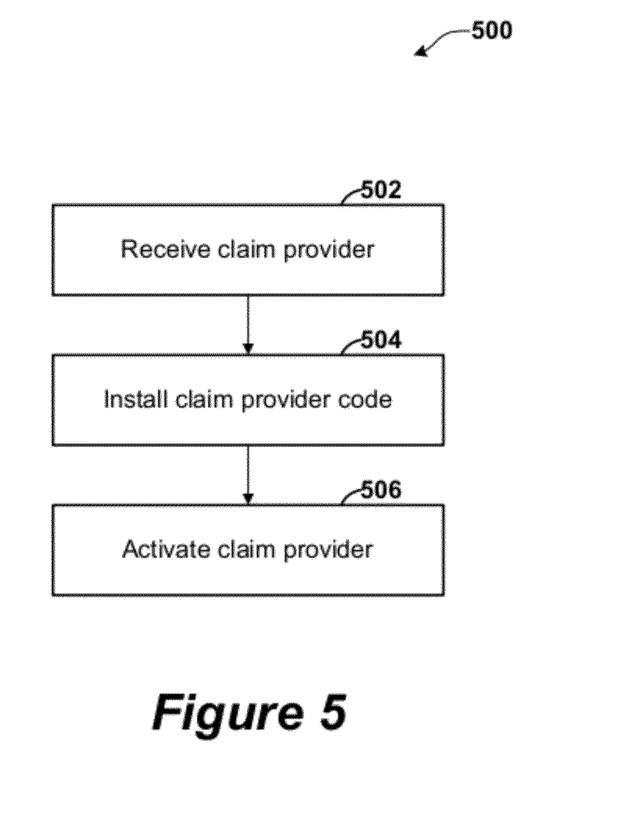
FIG. 5 is a flowchart illustrating an example operation of the server system.

FIG. 5 is a flowchart illustrating an example operation 500 of the server system 102. As illustrated in the example of FIG. 5, the operation 500 begins when the server system 102 receives a claim provider plug-in (502). The claim provider plug-in comprises software instructions. In various embodiments, the software instructions can be in various forms. For example, the claim provider plug-in can comprise object code that is directly executable by one or more processing units in the server system 102. In another example, the claim provider plug-in comprises programming language code that is compiled prior to execution or interpretation. In another example, the claim provider plug-in comprises programming language code that is interpreted at runtime.

The server system 102 can receive the claim provider plug-in in various ways. For example, the server system 102 can receive the claim provider plug-in from a computer storage medium, such as an optical disc, a magnetic disk, or a solid-state memory device. In another example, the server system 102 can receive the claim provider plug-in from a communications medium, such as the Internet or a local area network.

After receiving the claim provider plug-in, the server system 102 installs the claim provider plug-in (504). In other words, the server system 102 prepares the claim provider plug-in for operation. In various embodiments, the server system 102 installs the claim provider plug-in in various ways. For example, the server system 102 can install the claim provider plug-in by storing the claim provider plug-in as one or more files in a particular file system folder. In this example, the server system 102 automatically instantiates the claim provider plug-in from files in the particular file system folder. In another example, the server system 102 modifies one or more configuration settings (e.g., registry keys, environment variables, etc.) such that the server system 102 dynamically accesses the claim provider plug-in.

After the server system 102 installs the claim provider plug-in, the server system 102 activates the claim provider plug-in (506). When activated, the server system 102 can use the claim provider plug-in as described above. For example, the server system 102 can activate the claim provider plug-in by creating an instance of object-oriented programming class defined by the claim provider plug-in.

Figure 6:
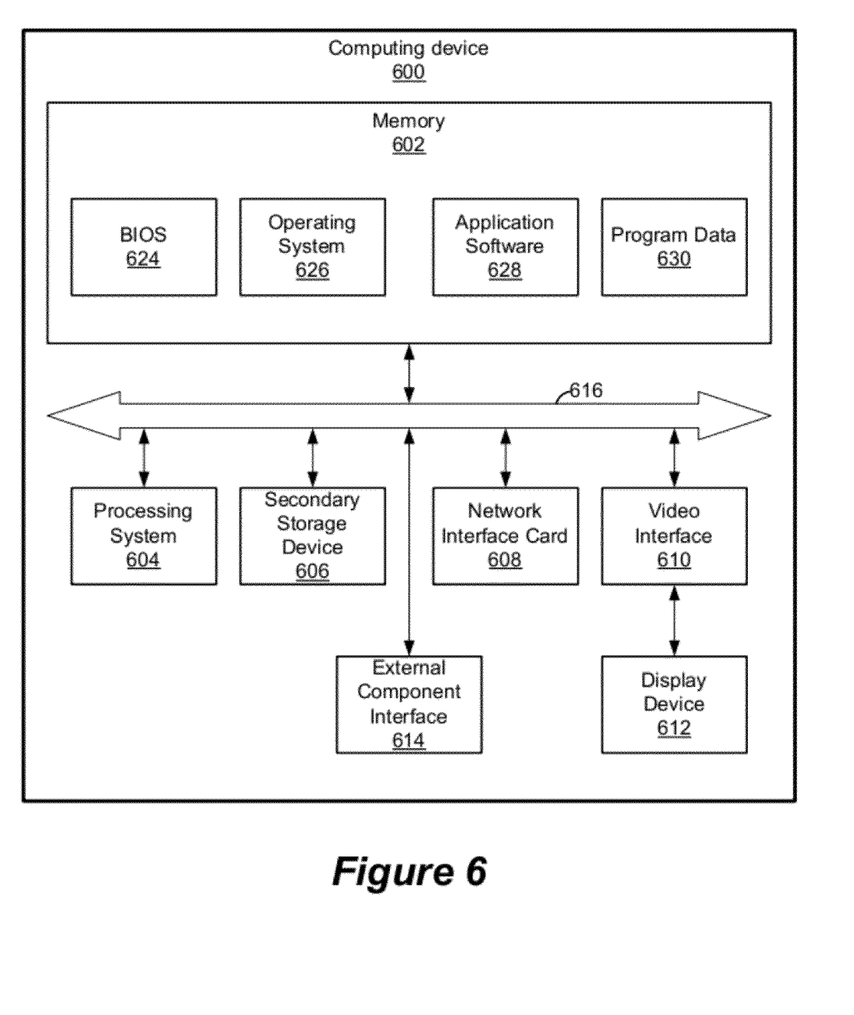
FIG. 6 is a block diagram illustrating an example computing device.

FIG. 6 is a block diagram illustrating an example computing device 600. In some embodiments, the server system 102, the client device 104, and the client device 106 are implemented using one or more computing devices like the computing device 600. It should be appreciated that in other embodiments, the server system 102, the client device 104, and/or the client device 106 are implemented using computing devices having hardware components other than those illustrated in the example of FIG. 6.

The term computer readable media as used herein may include computer storage media and communication media. As used in this document, a computer storage medium is a device or article of manufacture that stores data and/or software instructions readable by a computing device. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

In the example of FIG. 6, the computing device 600 comprises a memory 602, a processing system 604, a secondary storage device 606, a network interface card 608, a video interface 610, a display unit 612, an external component interface 614, and a communication medium 616. The memory 602 includes one or more computer storage media capable of storing data and/or instructions. In different embodiments, the memory 602 is implemented in different ways. For example, the memory 602 can be implemented using various types of computer storage media.

The processing system 604 includes one or more processing units. A processing unit is a physical device or article of manufacture comprising one or more integrated circuits that selectively execute software instructions. In various embodiments, the processing system 604 is implemented in various ways. For example, the processing system 604 can be implemented as one or more processing cores. In another example, the processing system 604 can comprise one or more separate microprocessors. In yet another example embodiment, the processing system 604 can comprise an ASIC that provides specific functionality. In yet another example, the processing system 604 provides specific functionality by using an ASIC and by executing computer-executable instructions.

The secondary storage device 606 includes one or more computer storage media. The secondary storage device 606 stores data and software instructions not directly accessible by the processing system 604. In other words, the processing system 604 performs an I/O operation to retrieve data and/or software instructions from the secondary storage device 606. In various embodiments, the secondary storage device 606 comprises various types of computer storage media. For example, the secondary storage device 606 can comprise one or more magnetic disks, magnetic tape drives, optical discs, solid state memory devices, and/or other types of computer storage media.

The network interface card 608 enables the computing device 600 to send data to and receive data from a communication network. In different embodiments, the network interface card 608 is implemented in different ways. For example, the network interface card 608 can be implemented as an Ethernet interface, a token-ring network interface, a fiber optic network interface, a wireless network interface (e.g., WiFi, WiMax, etc.), or another type of network interface.

The video interface 610 enables the computing device 600 to output video information to the display unit 612. The display unit 612 can be various types of devices for displaying video information, such as a cathode-ray tube display, an LCD display panel, a plasma screen display panel, a touch-sensitive display panel, an LED screen, or a projector. The video interface 610 can communicate with the display unit 612 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 614 enables the computing device 600 to communicate with external devices. For example, the external component interface 614 can be a USB interface, a FireWire interface, a serial port interface, a parallel port interface, a PS/2 interface, and/or another type of interface that enables the computing device 600 to communicate with external devices. In various embodiments, the external component interface 614 enables the computing device 600 to communicate with various external components, such as external storage devices, input devices, speakers, modems, media player docks, other computing devices, scanners, digital cameras, and fingerprint readers.

The communications medium 616 facilitates communication among the hardware components of the computing device 600. In the example of FIG. 6, the communications medium 616 facilitates communication among the memory 602, the processing system 604, the secondary storage device 606, the network interface card 608, the video interface 610, and the external component interface 614. The communications medium 616 can be implemented in various ways. For example, the communications medium 616 can comprise a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 602 stores various types of data and/or software instructions. For instance, in the example of FIG. 6, the memory 602 stores a Basic Input/Output System (BIOS) 624, and an operating system 626. The BIOS 624 includes a set of software instructions that, when executed by the processing system 604, cause the computing device 600 to boot up. The operating system 626 includes a set of software instructions that, when executed by the processing system 604, cause the computing device 600 to provide an operating system that coordinates the activities and sharing of resources of the computing device 600. Furthermore, the memory 602 stores application software 628. The application software 628 comprises computer-executable instructions, that when executed by the processing system 604, cause the computing device 600 to provide one or more applications. The memory 602 also stores program data 630. The program data 630 is data used by programs that execute on the computing device 600.

The various embodiments described above are provided by way of illustration only and should not be construed as limiting. Those skilled in the art will readily recognize various modifications and changes that may be made without following the example embodiments and applications illustrated and described herein. For example, the operations shown in the figures are merely examples. In various embodiments, similar operations can include more or fewer steps than those shown in the figures. Furthermore, in other embodiments, similar operations can include the steps of the operations shown in the figures in different orders.

What is claimed is:

1. A method for enabling use of security tokens to control access to resources, the method comprising:
   receiving, by a server system, multiple claim provider plug-ins, each of the claim provider plug-ins implementing a same software interface;
   installing, by the server system, the claim provider plug-ins by modifying one or more configuration settings such that the server system dynamically accesses the claim provider plug-in;
   providing, by the server system, a search response to a client device, the search response comprising claim description data, the claim description data describing germane claims, the germane claims being among claims provided by the claim provider plug-ins;
   receiving, by the server system, a resource from the client device;
   providing interface data to the client device when the resource is received from the server system, the interface data representing a search claim interface that comprises one or more features to receive one or more search criteria from a user;
   receiving, by the server system, a search request from the client device, the search request comprising search criteria data, the search criteria data representing the one or more search criteria, the search criteria including one or more keywords;
   wherein each of the germane claims satisfies the one or more search criteria;
   wherein the software interface declares a description query method;
   providing description query requests to each of the claim provider plug-ins, the description query requests invoking the description query method of the claim provider plug-ins;
   receiving description query responses from the claim provider plug-ins in response to the description query requests, the description query responses comprising the claim description data; and
   controlling, by the server system, access to the resource on a basis of claims provided by the claim provider plug-ins.

2. The method of claim 1, wherein the claim provider plug-ins implement the software interface in different ways and provide claims that assert different things.

3. The method of claim 2, wherein the claim provider plug-ins use different data sources to provide the claims provided by the claim provider plug-ins.

4. The method of claim 1, wherein the claim description data comprises a title for each of the germane claims, long-form written descriptions of the germane claims, and data specifying applicable entity types for the germane claims.

5. The method of claim 1, further comprising:
   receiving, by the server system, an authentication request from a the user; and
   sending, by the server system, a security token to the user, the security token comprising a given claim, the given claim being among the claims provided by the claim provider plug-ins.

6. The method of claim 5,
   wherein the software interface declares an augmentation method; and
   further comprising:
   authenticating an identity of the user;
   providing augmentation requests to the claim provider plug-ins, the augmentation requests invoking the augmentation method of the claim provider plug-ins;
   receiving augmentation responses from the claim provider plug-ins in response to the augmentation requests, at least one of the augmentation responses comprising the given claim; and
   generating the security token.

7. The method of claim 1,
   wherein the method further comprises:
   receiving, by the server system, a policy edit request, the policy edit request specifying that a first user wants an access policy for the resource to require users to provide a given claim in order to access the resource, the given claim being among the claims provided by the claim provider plug-ins; and
   editing, by the server system, the access policy to require users to provide the given claim in order to access the resource; and
   wherein controlling access to the resource comprises controlling access to the resource on a basis of the access policy.

8. The method of claim 7, wherein controlling access to the resource on the basis of the access policy comprises:
   receiving, by the server system, a security token from a second user; and
   determining, by the server system, whether the second user is authorized to access the resource by determining whether claims in the security token are sufficient to satisfy the access policy.

9. A server system comprising:
   at least one computer with a processing unit; and
   a data storage system comprising at least one computer storage medium, the data storage system storing computer-executable instructions that, when executed by the processing unit, cause the server system to:
   install multiple claim provider plug-ins without changing programming code of software previously installed on the server system, the multiple claim provider plug-ins being installed by modifying one or more configuration settings such that the server system dynamically accesses the multiple claim provider plug-ins, each of the claim provider plug-ins implementing a same software interface, the claim provider plug-ins implementing the software interface in different ways and providing claims that assert different things;
   provide a search response to a first client device, the search response comprising claim description data, the claim description data describing germane claims, the germane claims being among the claims provided by the claim provider plug-ins;
   receive a resource from the first client device;
   provide interface data to the first client device when the resource is received from the server system, the interface data representing a search claim interface that comprises one or more features to receive one or more search criteria from a user;
   receive a search request from the first client device, the search request comprising search criteria data, the search criteria data representing the one or more search criteria, the search criteria including one or more keywords;
   wherein each of the germane claims satisfies the one or more search criteria;
   wherein the software interface declares a description query method;

provide description query requests to each of the claim provider plug-ins, the description query requests invoking the description query method of the claim provider plug-ins;

receive description query responses from the claim provider plug-ins in response to the description query requests, the description query responses comprising the claim description data; and control access to the resource on a basis of claims provided by the claim provider plug-ins.

10. The server system of claim 9, wherein the computer-executable instructions cause the server system to:

authenticate the user;

receive applicable claims from the claim provider plug-ins;

generate a security token comprising the applicable claims;

send the security token to a second client device;

receive the security token; and determine based on the claims in the security token whether the user is authorized to access the resource.

11. The server system of claim 10, wherein the computer-executable instructions cause the server system to:

receive a policy edit request from the first client device, the policy edit request specifying that the user wants an access policy for the resource to require users to provide a given claim in order to access the resource, the given claim being among the claims provided by the claim provider plug-ins; and edit the access policy to require users to provide the given claim in order to access the resource.

12. The server system of claim 11, wherein the policy edit request specifies that the user wants the access policy for the resource to require users to provide the given claim in order to access the resource in a first way and to require the users to provide an additional claim in order to access the resource in a second way, the additional claim being among the claims provided by the claim provider plug-ins; and wherein execution of the computer-executable instructions further causes the server system to edit the access policy to require users to provide the given claim in order to access the resource in the first way and to require users to provide the additional claim in order to access the resource in the second way.

13. A computer storage medium, the computer storage medium not comprising a signal, the computer storage medium comprising computer-executable instructions that, when executed by a computing device, cause the computing device to:

install multiple claim provider plug-ins without changing programming code of programs previously installed on the computing device, the multiple claim provider plug-ins being installed by modifying one or more configuration settings such that a server system dynamically accesses the multiple claim provider plug-ins, each of the claim provider plug-ins implementing a same software interface in different ways, each of the claim provider plug-ins providing claims that assert different things;

receive a resource from a first client device;

provide data representing a claim search interface to the first client device, the claim search interface comprising one or more features to receive one or more search criteria;

receive a search request from the first client device, the search request comprising data representing the one or more search criteria, the search criteria including one or more keywords;

provide a search response to the first client device, the search response comprising claim description data describing germane claims, the germane claims being among the claims provided by the claim provider plug-ins, each of the germane claims satisfying the one or more search criteria;

wherein the software interface declares a description query method;

provide description query requests to each of the claim provider plug-ins, the description query requests invoking the description query method of the claim provider plug-ins;

receive description query responses from the claim provider plug-ins in responses to the description query requests, the description query responses comprising the claim description data;

receive a policy edit request from the first client device, the policy edit request specifying that a first user wants an access policy for the resource to require users to provide a given claim in order to access the resource, the given claim being among the germane claims;

edit the access policy to require users to provide the given claim in order to access the resource;

authenticate an identity of a second user;

receive applicable claims from the claim provider plug-ins, the applicable claims being among the claims provided by the claim provider plug-ins, each of the applicable claims regarding the identity of the second user;

generate a security token comprising the applicable claims;

send the security token to a second client device, the second user using the second client device;

receive the security token from the second client device; and determine whether the second user is authorized to access the resource by determining whether the claims in the security token satisfy the access policy for the resource.

* * * * *